(12) United States Patent
Swenson

(10) Patent No.: US 8,789,628 B2
(45) Date of Patent: Jul. 29, 2014

(54) MULTI-TERRAIN MOTORIZED WHEELCHAIR APPARATUS

(76) Inventor: Timmy R. Swenson, Marshall, MN (US)

(*) Notice: Subject to any disclaimer, the term of this patent is extended or adjusted under 35 U.S.C. 154(b) by 1025 days.

(21) Appl. No.: 12/502,396

(22) Filed: Jul. 14, 2009

(65) Prior Publication Data

US 2011/0011652 A1 Jan. 20, 2011

(51) Int. Cl.
| | |
|---|---|
| A61G 5/04 | (2013.01) |
| B62D 55/075 | (2006.01) |
| B62D 55/10 | (2006.01) |
| A61G 5/06 | (2006.01) |
| A61G 5/12 | (2006.01) |
| A61G 7/10 | (2006.01) |

(52) U.S. Cl.
CPC .............. B62D 55/075 (2013.01); B62D 55/10 (2013.01); A61G 5/066 (2013.01); A61G 2005/125 (2013.01); A61G 7/1036 (2013.01); Y10S 180/907 (2013.01)
USPC ......... 180/6.5; 180/9.23; 180/9.32; 180/9.34; 180/907

(58) Field of Classification Search
USPC ........ 180/6.5, 6.58, 6.7, 9.1, 9.23, 9.32, 9.34, 180/907; 280/DIG. 100, 5.22, 6.154; 297/411.32
See application file for complete search history.

(56) References Cited

U.S. PATENT DOCUMENTS

| | | | |
|---|---|---|---|
| 2,919,758 A | 1/1960 | Newton | |
| 3,077,238 A * | 2/1963 | Nelson ........................... | 180/192 |
| 3,191,953 A * | 6/1965 | Aysta ............................ | 280/5.22 |
| 3,231,036 A * | 1/1966 | Appenrodt ..................... | 180/6.5 |
| 3,259,200 A | 7/1966 | Rudolph | |
| 3,346,062 A * | 10/1967 | Richison et al. ............... | 180/6.7 |
| 3,417,832 A * | 12/1968 | Ziccardi .......................... | 180/9.3 |
| 3,529,688 A * | 9/1970 | Bruce ........................... | 180/9.23 |
| 3,533,483 A * | 10/1970 | Ballinger ...................... | 180/9.38 |
| 3,618,968 A * | 11/1971 | Greer .......................... | 280/47.11 |
| 3,869,011 A * | 3/1975 | Jensen ......................... | 180/9.23 |
| 3,964,786 A | 6/1976 | Mashuda | |
| 4,077,483 A | 3/1978 | Randolph | |
| 4,119,163 A * | 10/1978 | Ball ............................... | 180/6.5 |
| 4,456,086 A | 6/1984 | Wier | |
| 4,566,551 A | 1/1986 | Feliz | |
| 4,566,707 A * | 1/1986 | Nitzberg ......................... | 180/8.2 |
| 4,674,584 A | 6/1987 | Watkins | |

(Continued)

FOREIGN PATENT DOCUMENTS

| | | |
|---|---|---|
| CH | 632153 | 9/1982 |
| FR | 2574740 | * 6/1986 |
| WO | 8203320 | 10/1982 |
| WO | 2006128284 | 12/2006 |

*Primary Examiner* — Anne Marie Boehler
(74) *Attorney, Agent, or Firm* — Jeffrey A. Proehl; Woods, Fuller, Shultz & Smith, P.C.

(57) ABSTRACT

A multi-terrain motorized wheelchair apparatus is disclosed that comprises a seating assembly for supporting a user in a seated position, a track assembly with the seating assembly being pivotable with respect to the track assembly. The track assembly includes a pair of track units positioned on opposite sides of the seating assembly. The apparatus comprises a seating orientation adjustment assembly configured to adjust an orientation of the seating assembly with respect to the track assembly. The apparatus includes at least one drive assembly mounted on the seating assembly and which has at least one drive shaft structure connected to the track units to drive the track units. The seating assembly is supported on the track units of the track assembly by the drive shaft structure.

26 Claims, 5 Drawing Sheets

(56) References Cited

U.S. PATENT DOCUMENTS

| | | | |
|---|---|---|---|
| 4,898,256 A * | 2/1990 | Lehner | 180/8.2 |
| 5,123,495 A | 6/1992 | Littlejohn | |
| 5,335,741 A * | 8/1994 | Rabinovitz et al. | 180/8.2 |
| 5,366,036 A | 11/1994 | Perry | |
| 5,395,129 A | 3/1995 | Kao | |
| 5,577,567 A | 11/1996 | Johnson | |
| 5,924,503 A * | 7/1999 | Lykken | 180/6.7 |
| 6,076,619 A * | 6/2000 | Hammer | 180/6.48 |
| 6,325,167 B1 * | 12/2001 | Jiang | 180/9.32 |
| 6,564,889 B1 * | 5/2003 | Yamazaki et al. | 180/9.54 |
| 6,601,869 B2 | 8/2003 | Porcheron | |
| 6,604,590 B2 * | 8/2003 | Foulk, Jr. | 180/65.1 |
| 6,619,414 B2 | 9/2003 | Rau | |
| 6,805,209 B2 | 10/2004 | Hedeen | |
| 6,857,490 B2 | 2/2005 | Quigg | |
| 7,316,405 B2 * | 1/2008 | Kritman et al. | 280/5.22 |
| 7,357,201 B2 * | 4/2008 | Jordan | 180/9.26 |
| 7,690,738 B2 * | 4/2010 | Wilt | 305/133 |
| 7,708,093 B1 | 5/2010 | Baker | |
| 7,784,815 B2 | 8/2010 | Porcheron | |
| 7,798,260 B2 * | 9/2010 | Albright et al. | 180/6.7 |
| 7,806,209 B2 * | 10/2010 | Standish et al. | 180/9.5 |
| 8,056,656 B2 * | 11/2011 | Todd et al. | 180/9.25 |
| 8,104,554 B2 | 1/2012 | Graham | |
| 2003/0183428 A1 | 10/2003 | Hedeen | |
| 2006/0012148 A1 * | 1/2006 | Melgarejo et al. | 280/304.1 |
| 2007/0169968 A1 | 7/2007 | Todd | |

* cited by examiner

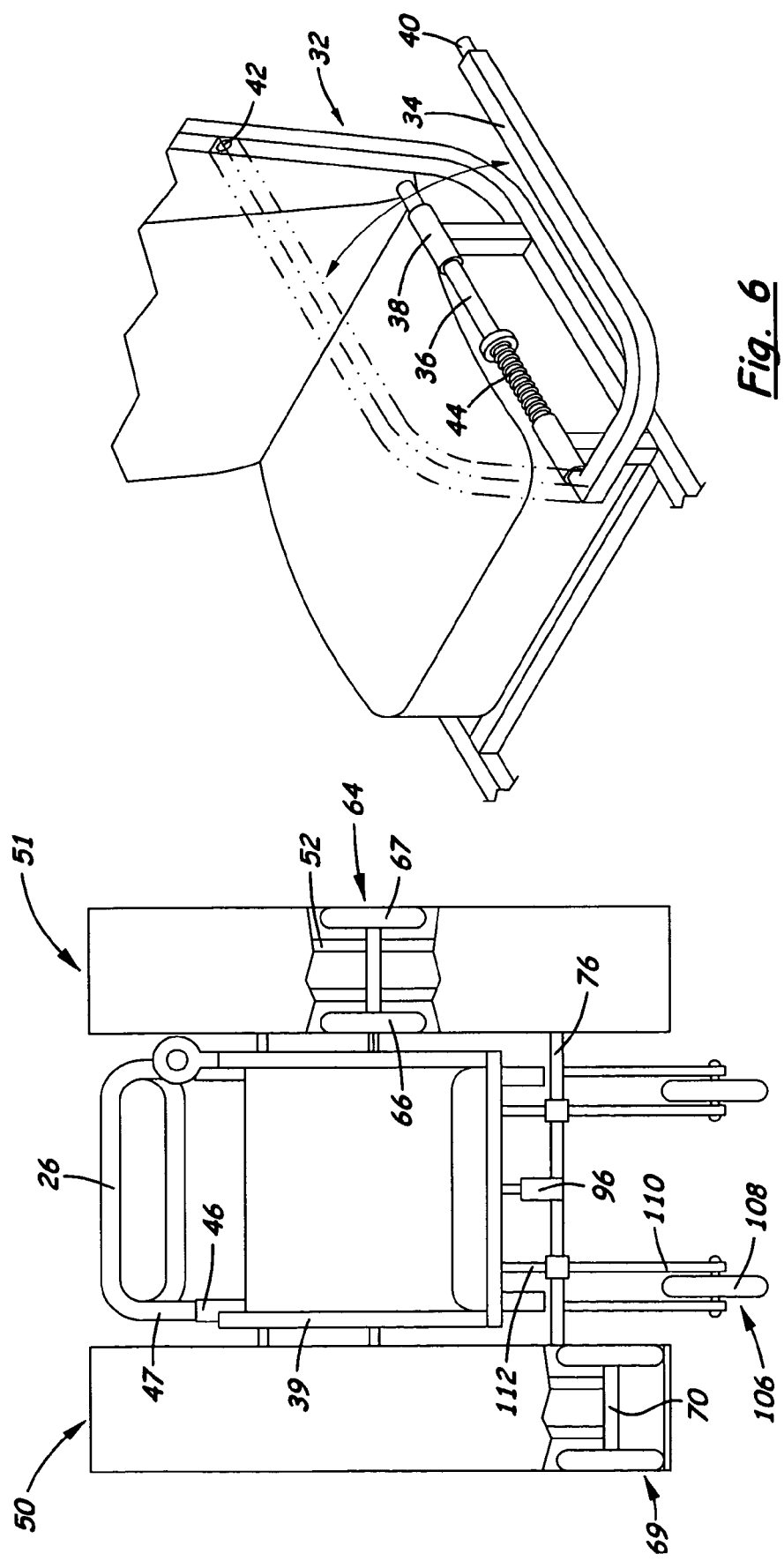

MULTI-TERRAIN MOTORIZED WHEELCHAIR APPARATUS

BACKGROUND

1. Field

The present disclosure relates to motorized wheelchairs and more particularly pertains to a new multi-terrain motorized wheelchair apparatus for providing transport of a user over terrain that may be rough or otherwise not suitable for conventional wheelchairs.

2. Description of the Prior Art

A number of motorized wheelchair and wheelchair-like apparatus have been proposed that include some provision for changing the orientation of the user to accommodate, for example, changes in the inclination of the ground surface.

SUMMARY

In view of the foregoing disadvantages inherent in the known types of motorized wheelchairs now present in the prior art, the present disclosure describes a new multi-terrain motorized wheelchair apparatus which may be utilized for providing transport of a user over terrain that may be rough or otherwise not suitable for conventional wheelchairs.

The present disclosure relates to a multi-terrain motorized wheelchair apparatus which comprises a seating assembly for supporting a user in a seated position and a track assembly, with the seating assembly being pivotable with respect to the track assembly. The track assembly includes a pair of track units positioned on opposite sides of the seating assembly. The apparatus includes a seating orientation adjustment assembly configured to adjust an orientation of the seating assembly with respect to the track assembly. The apparatus also comprises at least one drive assembly mounted on the seating assembly and including at least one drive shaft structure connected to the track units to drive the track units. The seating assembly is supported on the track units of the track assembly by the drive shaft structure.

There has thus been outlined, rather broadly, some of the more important elements of the invention in order that the detailed description thereof that follows may be better understood, and in order that the present contribution to the art may be better appreciated. There are additional elements of the invention that will be described hereinafter and which will form the subject matter of the claims appended hereto.

In this respect, before explaining at least one embodiment or implementation in greater detail, it is to be understood that the scope of the invention is not limited in its application to the details of construction and to the arrangements of the components set forth in the following description or illustrated in the drawings. The invention is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present invention.

The advantages of the various embodiments of the present invention, along with the various features of novelty that characterize the invention, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein:

FIG. 5 is a schematic top view of the wheelchair apparatus, according to an illustrative embodiment.

FIG. 6 is a schematic perspective view of an optional arm rest structure, according to an illustrative embodiment.

DETAILED DESCRIPTION

Figure 1:
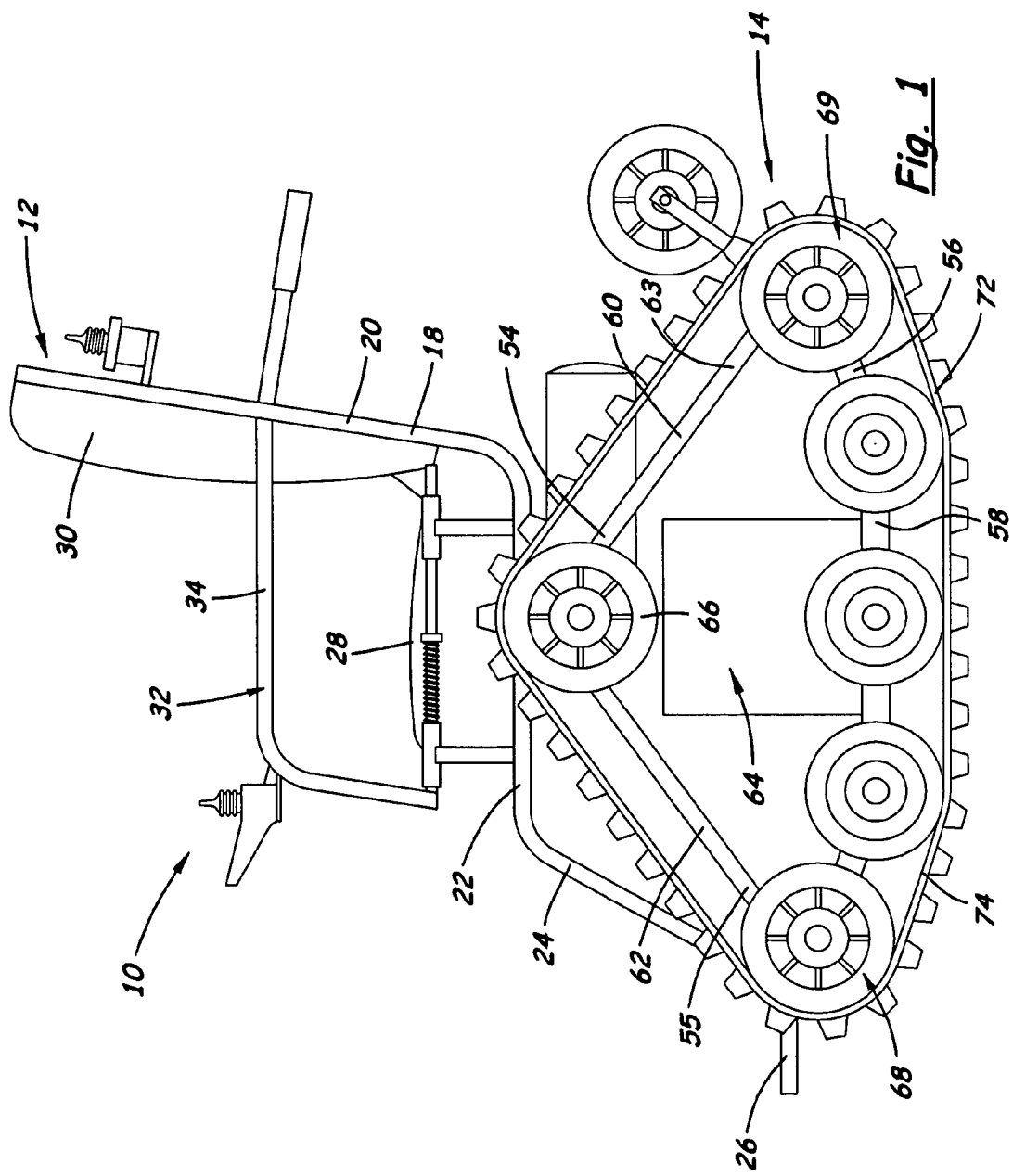
FIG. 1 is a schematic side view of a new multi-terrain motorized wheelchair apparatus according to the present disclosure.
Figure 2:
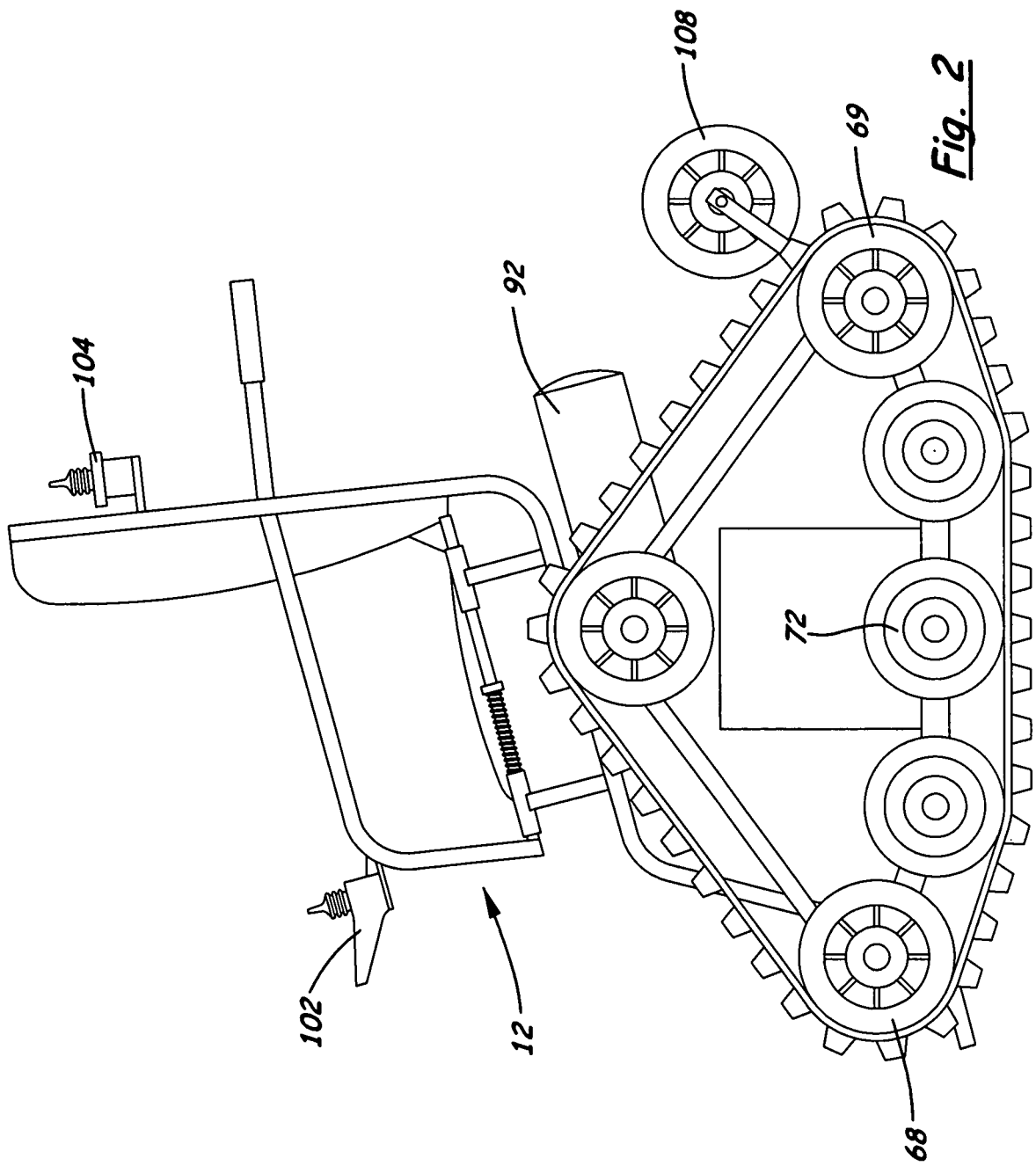
FIG. 2 is a schematic side view of the wheelchair apparatus, according to an illustrative embodiment, with the seating assembly shown tilted forwardly with respect to the track assembly.
Figure 3:
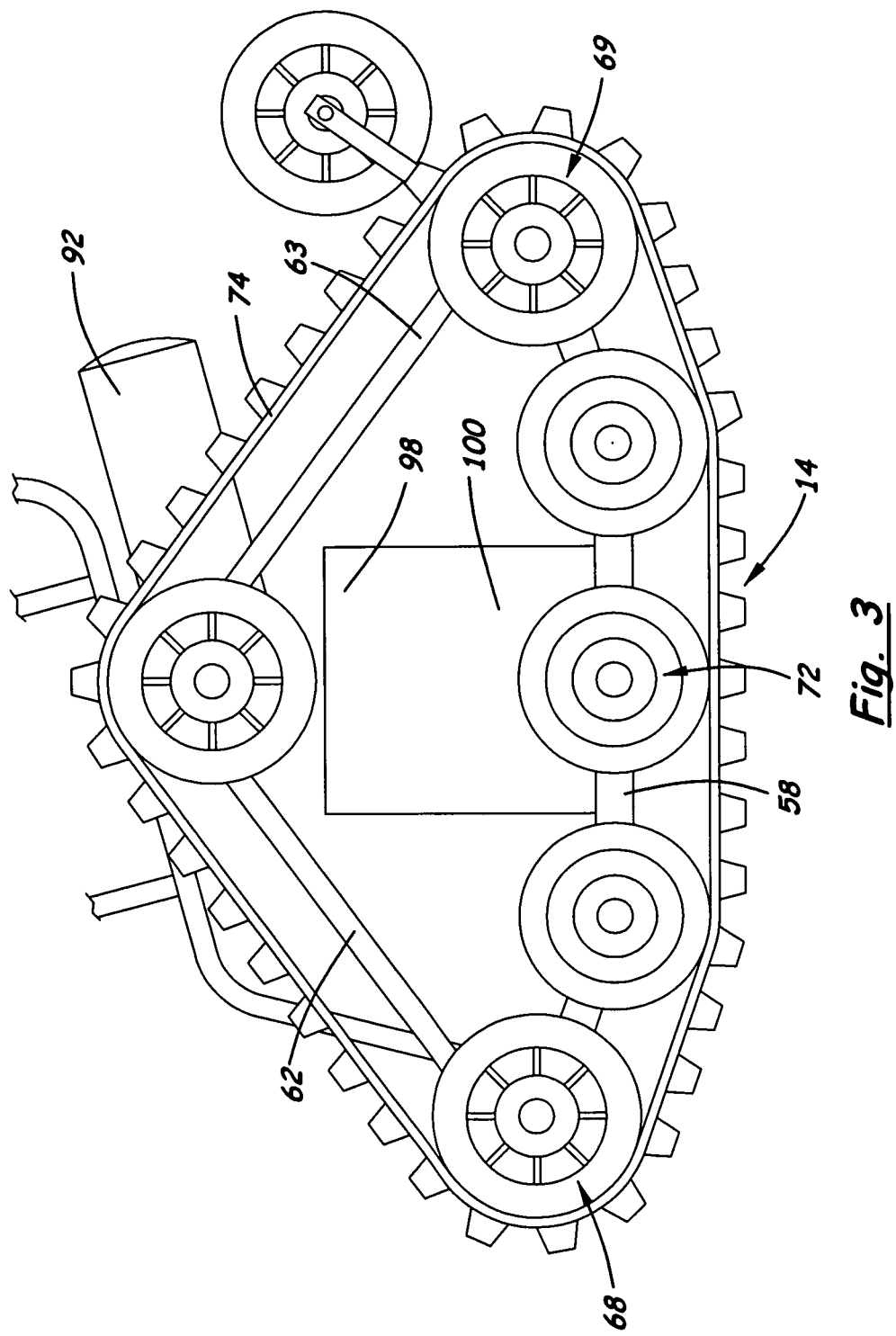
FIG. 3 is a schematic side view of the track assembly, according to an illustrative embodiment.
Figure 4:
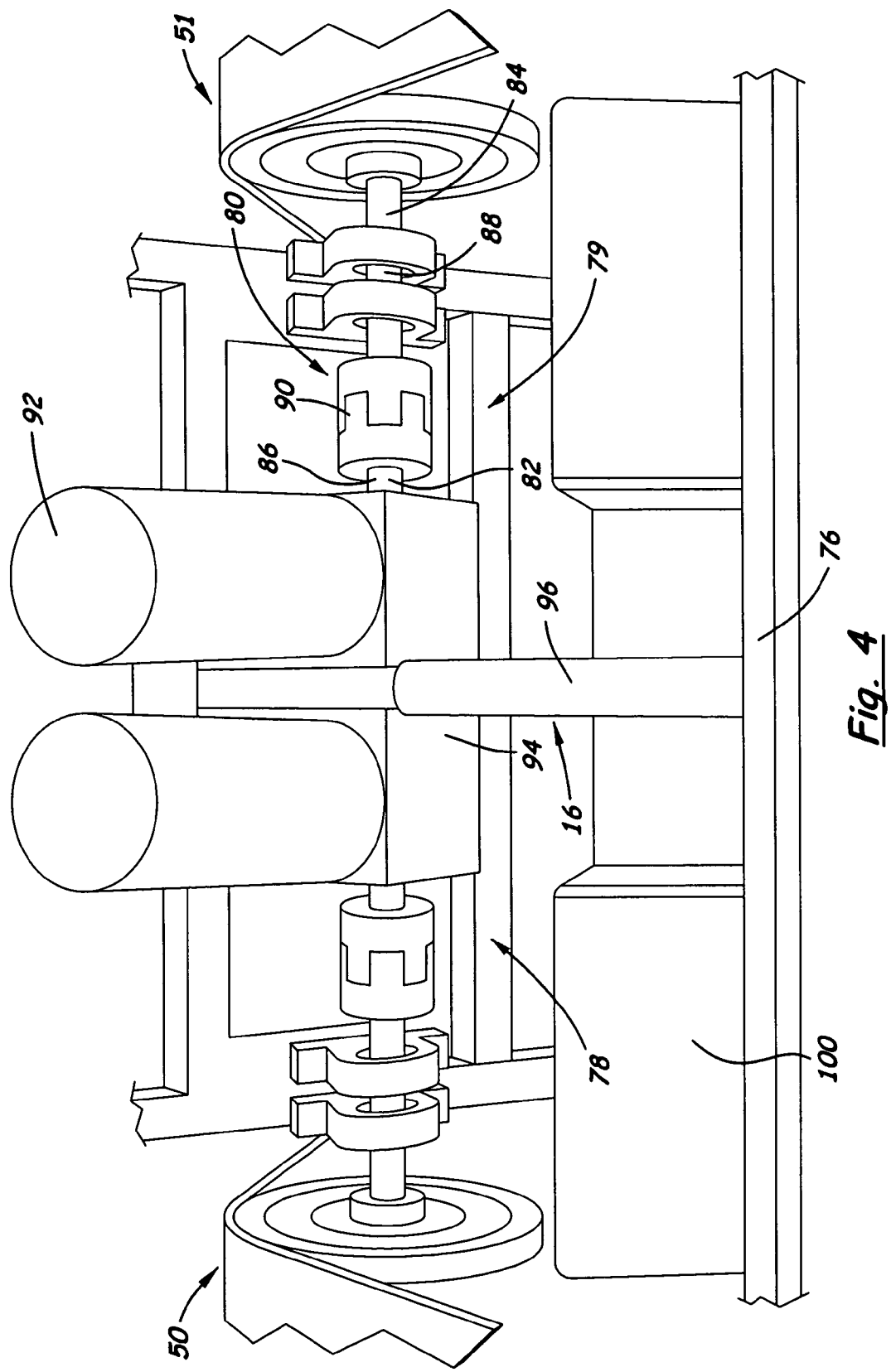
FIG. 4 is a schematic rear view of the drive assemblies, according to an illustrative embodiment.

With reference now to the drawings, and in particular to FIGS. 1 through 6 thereof, a new multi-terrain motorized wheelchair apparatus embodying the principles and concepts of the disclosed subject matter will be described.

As best illustrated in FIGS. 1 through 6, the disclosure relates to a multi-terrain motorized wheelchair apparatus 10 generally comprises a seating assembly 12 for supporting a user, a track assembly 14 for supporting and moving the seating assembly across a ground surface, a seating orientation assembly 16 for adjusting the orientation of the seating assembly with respect to the rack assembly.

In greater detail, the seating assembly 12 comprises a support frame 18 having a backrest portion 20, a seat portion 22, and a footrest portion 24. The backrest portion 20 may be mounted on the seat portion 22, and may extend from the seat portion in an upward direction. The footrest portion 24 may be mounted on the seat portion 22, and may extend from the seat portion in a downward direction.

The seating assembly 12 may also include a seat pad 28 mounted on the seat portion 22 of the support frame, and a back pad 30 mounted on the backrest portion 20 of the support frame.

The seating assembly 12 may also comprise one or more arm rest structures positioned on either side of the seat pad, and may be mounted on the seat portion of the support frame, and optionally the backrest portion as well. In some embodiments, one arm rest structure 32 is movable between a use position and an entry position which is highly useful for allowing the user to easily enter and exit the seat of the seating assembly. The arm rest structure 32 may include an arm rest 34, and the use portion of the arm rest structure is characterized by the arm rest 34 is oriented in a substantially vertical plane and the entry position is characterized by the arm rest being oriented in a substantially horizontal plane.

The arm rest structure 32 may include a pivot shaft 36 on which the arm rest 34 is mounted such that the arm rest pivots on the pivot shaft, and at least one pivot mount 38 that receives the pivot shaft. The pivot mount 38 may be mounted on the seat portion 22 of the support frame. Illustratively, a pair of pivot mounts may be utilized.

The arm rest structure 32 may further include a lock member 40 on the arm rest that is engageable with an aperture 42 on the support frame when the arm rest is positioned in the use position. The aperture 42 may be located on the backrest portion 22 of the support frame. The arm rest structure 32 may include a biasing structure 44 for biasing the lock member into the aperture 42. The biasing structure 44 may bias the pivot shaft and arm rest toward the aperture in the backrest portion 20. The arm rest and pivot shaft may be shiftable against the biasing structure to release the lock member from the aperture 42. The biasing structure may comprise a compression coil spring through which the pivot shaft extends, and that is captured between a retaining ring on the shaft and one of the pivot mounts. Those skilled in the art will recognize that other structures may be employed for the biasing structure.

The footrest portion 24 may include a footrest 26. In some embodiments, a distance between the footrest 26 and the seat portion 22 may be adjustable. The footrest portion 24 may include at least one upper member 46 and at least one lower member 47, with the footrest 26 being connected to the lower member 47. A portion of the lower member 47 may be slidably received in the upper member 46 to permit adjustment of an effective length of the upper and lower members.

The seating assembly 12 is pivotable with respect to the track assembly 14 to permit the user to adjust the tilt of the seating assembly in the forward direction or the rearward direction when, for example, ascending or descending an incline. In greater detail, the track assembly includes a pair of track units 50, 51 that are located on either side of the seating assembly 12. Each of the track units 50, 51 may comprise a track frame 52, and the track frame may have an upper apex 54, a forward apex 55, and a rearward apex 56. The track frame 52 may have a substantially triangular configuration, with each of the apexes 50, 51 and 52 corresponding to apexes of the triangular frame.

The track frame 52 may comprise a lower frame portion 58 which may be elongated with a forward end located toward the forward apex 55 and a rearward end located toward the rearward apex 56. The lower frame portion 58 may be substantially horizontally oriented when the apparatus 10 is situated on level ground. The lower frame portion 58 may include an inner member and an outer member, each of which may extend from the forward to the rearward ends of the lower frame portion.

The track frame 52 may also include an upper frame portion 60 mounted on the lower frame portion 58 and extending upwardly toward the seating assembly 12. The upper frame portion 60 may including a pair of descending frame structures 62, 63, with the descending frame structures 62, 63 being joined at the upper apex 54 and diverging as the structures extend downwardly from the apex 54 toward the forward apex 55 and rearward apex 56. One of the descending frame structures 62 may be joined to the lower frame portion 58 at the forward apex 55 and another one of the descending frame structures 63 may be joined to the lower frame portion at the rearward apex 56. Each of the descending frame structures 62, 63 may include an inner member and an outer member.

Each of the track units 50, 51 may include a drive wheel structure 64 that is mounted on the track frame 52, and may be mounted at a location toward the upper apex 54 of the track frame. The drive wheel structure 64 may comprise a pair of drive wheels 66, 67, each of which may be mounted on a drive shaft structure 80 described further below. Each of the drive wheels 66, 67 may extend in a plane that is oriented perpendicular to an axis of the drive shaft, and may be substantially vertical in orientation.

Further, each of the track units 50, 51 may comprise at least one apex wheel structure mounted on the track frame 52. Each track unit 50, 51 may include a forward apex wheel structure 68 that is located at the forward apex 55 of the track frame 52 and a rearward apex wheel structure 69 that is located at the rearward apex 56 of the track frame. Each of the apex wheel structures may comprise a pair of apex wheels, and each of the apex wheels may extend in a plane oriented perpendicular to an axis of a respective stub shaft 70 on which the apex wheels are mounted on the track frame 52.

Additionally, each of the track units 50, 51 may comprise at least one intermediate support wheel structure 72 that may be mounted on the track frame 52 and may be positioned forward of the rearward apex wheel structure 69 and rearward of the forward apex wheel structure 68. Thus, each of the intermediate support wheel structures 72 may be located between the forward apex wheel structure 68 and the rearward apex wheel structure 69. In some embodiments, the track unit includes three of the intermediate support wheels structures, although one, two, four or more intermediate support wheel structures may be utilized. Each of the one or more intermediate support wheel structures may include a pair of support wheels, with each of the support wheels extending in a plane oriented perpendicular to an axis of a stub shaft 70 on which the support wheels are mounted on the track frame. In the illustrative embodiments, the wheels of the intermediate support wheel structures 72 have lower surfaces that are oriented in a plane that is the ground surface when the apparatus rests on flat ground, while the wheels of the forward apex wheel structure and the rearward apex wheel structure are raised out of the plane of the intermediate wheel structures. The wheels of the forward apex wheel structure 68 and the wheels of the forwardmost intermediate wheel structure 72 may be aligned along a line that is angled upwardly from the plane of the wheels of the intermediate support structure, and the angle between the plane and the line may range between just greater than zero and approximately 45 degrees, with a range of between just greater than zero and 30 degrees being preferable, and between approximately 10 degrees and approximately 20 degrees most preferable.

A continuous track 74 may be included on each of the track units 50, 51, and may be entrained on the wheels of the track unit. The continuous track 74 may have a plurality of raised treads on an outer side or surface of the track.

The track assembly 14 may include a connecting structure 76 that connects the pair of track units 50, 51 together. The connecting structure 76 may comprise at least one transverse member connected to one of the upper 60 and lower 58 frame portions, and may comprise a pair of transverse members.

The motorized wheelchair apparatus 10 may include at least one drive assembly 78 that is configured to drive the track assembly 14. The drive assembly 78 may be mounted on the seating assembly 12, and may be connected to the pair of track units 50, 51. The at least one drive assembly may comprise a pair of drive assemblies 78, 79, with each drive assembly being configured to operate one of the track units independently of the other one of the drive assemblies operating the other one of the track units to permit skid steering of the apparatus 10.

Each of the drive assemblies 78, 79 may comprise a drive shaft structure 80 that is connected to one of the track units. The drive shaft structure 80 may be connected to the drive wheel structure 64 of the respective track unit to rotate the drive wheel structure and the continuous track 74. The drive shaft structure 80 may have an inner end portion 82 and an outer end portion 84, with the outer end portion being connected to the drive wheel structure 64 of the respective track unit. By virtue of the drive assemblies, and portions of the drive shaft structures, being mounted on the seating assembly as well as being connected to the track units, the seating assembly may be supported on the track units by the drive shaft structures even as the drive shaft structures are transmitting rotational power to the track units. Also, the seating assembly may tilt with respect to the drive assembly about the common axis of the drive shaft structures. As will be appreciated below, the seating orientation assembly 16 resists any torque applied to the seating assembly by the rotation of the drive shaft structure which is journaled on the seating assembly. The connection between the seating assembly and the track assembly is thus simplified, and it is believed that the center of gravity of the apparatus 10 is relatively closer to the ground than if this configuration is not employed.

In greater detail, the drive shaft structure 80 may include an inner shaft 86 that includes the inner end portion 82 and an outer shaft 88 that includes the outer end portion 84. The inner and outer shafts may be mounted on bearings that are mounted on the seating assembly 12, such as on the bottom side of the seat portion 22. The drive shaft structure 80 may further comprise a coupler 90 that connects the inner shaft 86 to the outer shaft 88 such that the inner and outer shafts rotate together, and the coupler may include an isolation element to help isolate impulses or shocks from being communicated from the inner shaft to the outer shaft. Each of the drive assemblies 78, 79 may comprise a drive motor 92 configured to rotate the respective drive shaft structure 80. The drive motor may be mounted on the seating assembly, such as on the seat portion, and may have a motor output shaft that rotates and provides the output of the motor. The drive assemblies 78, 79 may also each include a gearbox 94 connecting the drive motor to the drive shaft. The gearbox 94 may be connected to the motor shaft of the respective drive motor 92 and the inner end portion 82 of the drive shaft structure. The gearbox 94 may have an input that is oriented substantially perpendicularly to an output, so that the motor shaft is oriented substantially perpendicular to the drive shaft structure. The gearbox 94 may also be mounted on the seating assembly 12.

The seating orientation adjustment assembly 16 of the wheelchair apparatus 10 may be configured to adjust an orientation of the seating assembly 12 with respect to the track assembly 14. The orientation adjustment assembly 16 may be linked to the seating assembly 12 and the track assembly 14, and may comprise an actuator 96 mounted to the seating assembly 12 and the track assembly 14. The actuator 96 may comprise a telescopic actuator (such as, for example, a linear actuator) that is configured to move a mount located on the seating assembly 12 and a mount located on the track assembly 14 toward and away from each other such that extension or elongation of the actuator 96 causes the seating assembly 12 to rotate in one direction with respect to the track assembly and retraction or shortening of the actuator causes the seating assembly to rotate in another direction with respect to the track assembly. In the illustrative embodiments, the elongation of the actuator 96 causes the seating assembly 12 to tip or incline forward with respect to the track assembly 14, and contraction of the actuator causes the seating assembly to tip or incline rearwardly with respect to the track assembly.

The wheelchair apparatus 10 may also comprise a power source 98 for providing power to the drive assembly 78. The power source 98 may be mounted on the track assembly 12, so that the weight of the power source does not change with the shifting or tilting of the seating assembly. In some embodiments, the power source may be mounted on the connecting structure 76 of the track assembly. The power source 98 may comprise at least one battery, and may comprise more than one battery.

The wheelchair apparatus 10 may also include a control assembly, and the control assembly may include a primary control structure 102 that is located on one of the armrests of the seating assembly, and may control various aspects of the operation of the apparatus, such as forward and rearward motion and speed, steering, and tilt movement of the seating assembly. In some embodiments of the apparatus 10, an attendant control structure 104 may be mounted on the rear of the backrest portion of the support frame. A pair of attendant handles may be located on the rear for allowing a person walking behind the wheelchair apparatus to hold onto the handles and optionally operate the attendant control.

In other optional embodiments, the wheelchair apparatus 10 may include a stabilization assembly 106 that is configured to enhance stability of the track assembly when the seating assembly 12 is tilted with respect to the track assembly 14. The stabilization assembly 106 may include stabilizations aids at both the front and rear of the apparatus 10, or just one of these locations. The stabilization assembly 106 may be configured so that it is activated or deployed when the seating assembly 12 is tilted forward or aft, so that forward tilting of the seating assembly 12 causes a stabilization aid at the front of the apparatus 10 to be deployed, and rearward tilting of the seating apparatus causes a stabilization aid at the rear of the apparatus 10 to be deployed.

In greater detail, the stabilization assembly 106 may comprise at least one stabilization roller 108, and the stabilization roller may be pivotable with respect to the track assembly. The stabilization roller 108 may be pivoted by tilt movement of the seating assembly 12, and may be movable between a deployed position and a retracted position. The deployed position may be characterized by the stabilization roller being extended forwardly or rearwardly of the track assembly 14 such that the roller 108 lies along a line defined by the nearest apex wheel structure 68, 69 and the nearest intermediate support wheel structure 72 to the stabilization roller. The stabilization assembly may include a pair of stabilization rollers 108 on one or both ends of the track assembly 14, with the pair of rollers being laterally spaced so that each roller is located adjacent to one of the track units 50, 51.

The stabilization assembly 106 may also include a swing arm 110 pivotally mounted on the track assembly 14, such as on the connecting structure 76, and that supports the stabilization roller 108 in its pivotal movement. The stabilization roller 108 may be mounted on the swing arm 110 at a location that is spaced along the swing arm from the point of mounting to the track assembly 14. The swing arm may be elongate with a first end mounted on the track assembly 14 and a second end on which the stabilization roller 108 is rotatably mounted. The stabilization assembly 106 may also include a linking arm 112 that is configured to move the stabilization roller 108 on the swing arm 110, and may be connected to the swing arm and to the seating assembly 12 to transfer the tilt movement of the seating assembly to the swing arm and the stabilization roller mounted on the swing arm.

With respect to the above description then, it is to be realized that the optimum dimensional relationships for the parts of the invention, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. A multi-terrain motorized personal transport apparatus, comprising:
   a seating assembly for supporting a user in a seated position;
   a track assembly for resting upon a ground surface, the seating assembly being pivotable with respect to the track assembly, the track assembly including a pair of track units positioned on opposite sides of the seating assembly, each of the track units including a plurality of wheel structures and a continuous track entrained on the wheel structures, the plurality of wheel structures being arranged so that an uppermost one of the wheel structures forms an upper apex in the continuous track;
   a seating orientation adjustment assembly configured to adjust an orientation of the seating assembly with respect to the track assembly; and
   at least one drive assembly carried on the seating assembly, the at least one drive assembly including a motor and at least one drive shaft structure connected to the motor and to the uppermost one of the wheel structures of the continuous track of the track units to drive the track units;
   wherein the seating assembly and the motor of the at least one drive assembly are supported on the track units of the track assembly by the drive shaft structure so that the seating assembly and the motor pivot as a unit with respect to the track assembly about a common pivot axis of the drive shaft structure, the common pivot axis passing through the uppermost one of the wheel structures located at the upper apex of the continuous track;
   wherein each track unit forms a ground contact surface extending continuously from a location forward of the seating assembly to a location rearward of the seating assembly; and
   a stabilization assembly configured to enhance stability of the track assembly when the seating assembly is tilted rearwardly with respect to the track assembly.

2. The apparatus of claim 1 wherein the at least one drive assembly comprises a pair of drive assemblies each configured to operate one of the track units independently of an other one of the drive assemblies operating an other one of the track units.

3. The apparatus of claim 1 wherein each of the track units comprises a track frame, the track frame having an upper apex, a forward apex, and a rearward apex, the track frame having a substantially triangular configuration.

4. The apparatus of claim 3 wherein the plurality of wheel structures of each of the track units comprises:
   a drive wheel structure mounted on the track frame, the drive wheel structure being the uppermost one of the wheel structures and being mounted toward the upper apex of the track frame;
   a forward apex wheel structure mounted at the forward apex of the track frame and a rearward apex wheel structure mounted at the rearward apex of the track frame;
   at least one intermediate support wheel structure mounted on the track frame, the at least one intermediate support wheel structure being positioned forward of the rearward apex wheel structure or rearward of the forward apex wheel structure.

5. The apparatus of claim 4 wherein the track frame of each track unit is configured so that when the at least one intermediate support wheel structure is rested on a substantially horizontal ground surface, the apex wheel structures are raised above the ground surface.

6. The apparatus of claim 1 wherein the seating assembly includes an arm rest structure including an arm rest, the arm rest structure being movable between a use position and an entry position, the use position of the arm rest structure being characterized by the arm rest being oriented in a substantially vertical plane and the entry position being characterized by the arm rest being oriented in a substantially horizontal plane.

7. The apparatus of claim 6 wherein the arm rest structure further includes
   a pivot shaft on which the arm rest is mounted such that the arm rest pivots on the pivot shaft; and
   at least one pivot mount receiving the pivot shaft, the at least one pivot mount being mounted on a support frame of the seating assembly.

8. The apparatus of claim 7 wherein the arm rest structure further comprises a lock member on the arm rest, the lock member being engageable with an aperture on the support frame when the arm rest is in the use position to hold the arm rest in the use position;
   a biasing structure for biasing the lock member into the aperture when the arm rest is in the use position.

9. The apparatus of claim 1 wherein the seating assembly includes a support frame including a seat portion and a footrest portion with a footrest, and wherein a distance between the footrest of the footrest portion and seat portion is adjustable.

10. The apparatus of claim 1 wherein the orientation adjustment assembly comprises a telescopic actuator linked to the seating assembly and the track assembly.

11. The apparatus of claim 1 wherein the at least one stabilization roller comprises a pair of laterally-spaced stabilization rollers.

12. The apparatus of claim 1 wherein the track of each of the track units has an inner edge defining a substantially vertical plane; and
   wherein the seating assembly is positioned completely between the substantially vertical planes.

13. The apparatus of claim 1 wherein the seating assembly is tiltable forwardly about the axis of the drive shaft structure with respect to the track units so that the seating orientation adjustment assembly is able to adjust a center of gravity of a person in the seat forwardly of the axis of the drive shaft structure.

14. The apparatus of claim 1 wherein the seating assembly includes a seat positioned above the axis of the drive shaft; and a battery for supplying power to the drive assembly being mounted on the seat structure at a location below the axis of the drive shaft such that tilting the seating assembly in the forward or rearward directions causes movement of the battery in a direction opposite of the seat.

15. The apparatus of claim 1 wherein the track assembly remains in contact with the ground surface during any forward or rearward movement of the apparatus.

16. The apparatus of claim 1 wherein the ground contact surface of the track units contacts the ground surface during any forward or rearward movement of the apparatus.

17. The apparatus of claim 1 wherein the ground contact surface of each track unit has a substantially planar central portion and a pair of end portions positioned on opposite ends of the central portion.

18. The apparatus of claim 17 wherein each of the end portions of the ground contact surface are substantially planar, and each of the substantially planar end portions are upwardly inclined from the central portion.

19. The apparatus of claim 1 wherein a height of the motor above a ground surface below the tracks is substantially equal to a height of the drive shaft above the ground surface.

20. A multi-terrain motorized wheelchair apparatus, comprising:
a seating assembly for supporting a user in a seated position;
a track assembly, the seating assembly being pivotable with respect to the track assembly, the track assembly including a pair of track units positioned on opposite sides of the seating assembly;
a seating orientation adjustment assembly configured to adjust an orientation of the seating assembly with respect to the track assembly; and
at least one drive assembly mounted on the seating assembly and including at least one drive shaft structure connected to the track units to drive the track units;
wherein the seating assembly is supported on the track units of the track assembly by the drive shaft structure and the seating assembly pivots with respect to the track assembly about an axis of the drive shaft structure;
wherein the at least one drive assembly comprises a pair of drive assemblies each configured to operate one of the track units independently of an other one of the drive assemblies operating an other one of the track units;
wherein each of the track units comprises a track frame, the track frame having an upper apex, a forward apex, and a rearward apex, the track frame having a substantially triangular configuration;
wherein each of the track units comprises
 a drive wheel structure mounted on the track frame, the drive wheel structure being mounted toward the upper apex of the track frame;
 a plurality of apex wheel structures mounted on the track frame and comprising a forward apex wheel structure located at the forward apex of the track frame and a rearward apex wheel structure located at the rearward apex of the track frame;
 at least one intermediate support wheel structure mounted on the track frame, the at least one intermediate support wheel structure being positioned forward of the rearward apex wheel structure or rearward of the forward apex wheel structure; and
 a continuous track entrained on the wheel structures;
wherein the track frame of each track unit is configured so that when the at least one intermediate support wheel structure is rested on a substantially horizontal ground surface, the apex wheel structures are raised above the ground surface;
wherein the seating assembly includes an arm rest structure including an arm rest, the arm rest structure being movable between a use position and an entry position, the use position of the arm rest structure being characterized by the arm rest being oriented in a substantially vertical plane and the entry position being characterized by the arm rest being oriented in a substantially horizontal plane;
wherein the arm rest structure further includes:
 a pivot shaft on which the arm rest is mounted such that the arm rest pivots on the pivot shaft; and
 at least one pivot mount receiving the pivot shaft, the at least one pivot mount being mounted on a support frame of the seating assembly;
wherein the arm rest structure further comprises a lock member on the arm rest, the lock member being engageable with an aperture on the support frame when the arm rest is in the use position to hold the arm rest in the use position;
a biasing structure for biasing the lock member into the aperture when the arm rest is in the use position;
wherein the seating assembly includes a support frame including a seat portion and a footrest portion with a footrest, and wherein a distance between the footrest of the footrest portion and seat portion is adjustable;
wherein the orientation adjustment assembly comprises a telescopic actuator linked to the seating assembly and the track assembly;
a stabilization assembly configured to enhance stability of the track assembly when the seating assembly is tilted with respect to the track assembly, the stabilization assembly being actuated by tilting of the seating assembly with respect to the track assembly;
wherein the stabilization assembly comprises at least one stabilization roller movable between a deployed position and a retracted position, the deployed position being characterized by the at least one stabilization roller extending rearwardly of the track assembly and the retracted position being characterized by the at least one stabilization roller not extending rearwardly of the track assembly;
wherein the at least one stabilization roller comprises a pair of laterally-spaced stabilization rollers;
wherein the stabilization assembly further comprises:
 a swing arm pivotally mounted on the track assembly, the at least one stabilization roller being mounted on the swing arm at a location spaced on the swing arm from the track assembly; and
 a linking arm configured to move the stabilization roller on the swing arm, the linking arm being connected to the swing arm and to the seating assembly to transfer tilt movement of the seating assembly to the swing arm and the stabilization roller mounted on the swing arm.

21. A multi-terrain motorized personal transport apparatus, comprising:
a seating assembly for supporting a user in a seated position;
a track assembly for resting upon a ground surface, the seating assembly being pivotable with respect to the track assembly, the track assembly including a pair of track units positioned on opposite sides of the seating assembly, each of the track units including a plurality of wheel structures and a continuous track entrained on the wheel structures, the plurality of wheel structures being arranged so that an uppermost one of the wheel structures forms an upper apex in the continuous track;
a seating orientation adjustment assembly configured to adjust an orientation of the seating assembly with respect to the track assembly; and
at least one drive assembly carried on the seating assembly, the at least one drive assembly including a motor and at least one drive shaft structure connected to the motor and to the uppermost one of the wheel structures of the continuous track of the track units to drive the track units;

wherein the seating assembly and the motor of the at least one drive assembly are supported on the track units of the track assembly by the drive shaft structure so that the seating assembly and the motor pivot as a unit with respect to the track assembly about a common pivot axis of the drive shaft structure, the common pivot axis passing through the uppermost one of the wheel structures located at the upper apex of the continuous track; and wherein each track unit forms a ground contact surface extending continuously from a location forward of the seating assembly to a location rearward of the seating assembly;

wherein the pivot axis of the drive shaft structure about which the seating assembly pivot is located directly over a center point of the ground contact surface of the track units.

22. A multi-terrain motorized personal transport apparatus comprising:

a seating assembly for supporting a user in a seated position;

a track assembly, the seating assembly being pivotable with respect to the track assembly, the track assembly including a pair of track units positioned on opposite sides of the seating assembly;

a seating orientation adjustment assembly configured to adjust an orientation of the seating assembly with respect to the track assembly; and at least one drive assembly mounted on the seating assembly and including at least one drive shaft structure connected to the track units to drive the track units;

wherein the seating assembly is supported on the track units of the track assembly by the drive shaft structure and the seating assembly pivots with respect to the track assembly about an axis of the drive shaft structure;

wherein the at least one drive assembly comprises a pair of drive assemblies each configured to operate one of the track units independently of an other one of the drive assemblies operating an other one of the track units;

wherein each of the track units comprises a track frame, the track frame having an upper apex, a forward apex, and a rearward apex, the track frame having a substantially triangular configuration;

wherein each of the track units comprises
  a drive wheel structure mounted on the track frame, the drive wheel structure being mounted toward the upper apex of the track frame;
  a plurality of apex wheel structures mounted on the track frame and comprising a forward apex wheel structure located at the forward apex of the track frame and a rearward apex wheel structure located at the rearward apex of the track frame;
  at least one intermediate support wheel structure mounted on the track frame, the at least one intermediate support wheel structure being positioned forward of the rearward apex wheel structure or rearward of the forward apex wheel structure; and
  a continuous track entrained on the wheel structures;

wherein the track frame of each track unit is configured so that when the at least one intermediate support wheel structure is rested on a substantially horizontal ground surface, the apex wheel structures are raised above the ground surface;

wherein the seating assembly includes an arm rest structure including an arm rest;

wherein the seating assembly includes a support frame including a seat portion and a footrest portion with a footrest, and wherein a distance between the footrest of the footrest portion and seat portion is adjustable; and wherein the orientation adjustment assembly comprises a telescopic actuator linked to the seating assembly and the track assembly.

23. The apparatus of claim 22 additionally comprising a stabilization assembly configured to enhance stability of the track assembly, the stabilization assembly comprising at least one stabilization roller extending rearwardly of the track assembly.

24. The apparatus of claim 23 wherein the at least one stabilization roller comprises a pair of laterally-spaced stabilization rollers.

25. The apparatus of claim 22 wherein the arm rest structure is movable between a use position and an entry position, the use position of the arm rest structure being characterized by the arm rest being oriented in a substantially vertical plane and the entry position being characterized by the arm rest being oriented in a substantially horizontal plane.

26. A multi-terrain motorized personal transport apparatus comprising:

a seating assembly for supporting a user in a seated position;

a track assembly, the seating assembly being pivotable with respect to the track assembly, the track assembly including a pair of track units positioned on opposite sides of the seating assembly;

a seating orientation adjustment assembly configured to adjust an orientation of the seating assembly with respect to the track assembly; and at least one drive assembly mounted on the seating assembly and including at least one drive shaft structure connected to the track units to drive the track units;

wherein the seating assembly is supported on the track units of the track assembly by the drive shaft structure and the seating assembly pivots with respect to the track assembly about an axis of the drive shaft structure;

wherein the at least one drive assembly comprises a pair of drive assemblies each configured to operate one of the track units independently of an other one of the drive assemblies operating an other one of the track units;

wherein each of the track units comprises a track frame, the track frame having an upper apex, a forward apex, and a rearward apex, the track frame having a substantially triangular configuration;

wherein each of the track units comprises
  a drive wheel structure mounted on the track frame, the drive wheel structure being mounted toward the upper apex of the track frame;
  a plurality of apex wheel structures mounted on the track frame and comprising a forward apex wheel structure located at the forward apex of the track frame and a rearward apex wheel structure located at the rearward apex of the track frame;
  at least one intermediate support wheel structure mounted on the track frame, the at least one intermediate support wheel structure being positioned forward of the rearward apex wheel structure or rearward of the forward apex wheel structure; and
  a continuous track entrained on the wheel structures;

wherein the track frame of each track unit is configured so that when the at least one intermediate support wheel structure is rested on a substantially horizontal ground surface, the apex wheel structures are raised above the ground surface;

wherein the seating assembly includes an arm rest structure including an arm rest, the arm rest structure being movable between a use position and an entry position, the use position of the arm rest structure being characterized by the arm rest being oriented in a substantially vertical plane and the entry position being characterized by the arm rest being oriented in a substantially horizontal plane;

wherein the seating assembly includes a support frame including a seat portion and a footrest portion with a footrest, and wherein a distance between the footrest of the footrest portion and seat portion is adjustable;

wherein the orientation adjustment assembly comprises a telescopic actuator linked to the seating assembly and the track assembly; and a stabilization assembly configured to enhance stability of the track assembly, the stabilization assembly comprising at least one stabilization roller extending rearwardly of the track assembly.

* * * * *